United States Patent [19]
Yamrom et al.

[11] Patent Number: 5,146,557
[45] Date of Patent: Sep. 8, 1992

[54] USER INTERFACE FOR A GOLF GREEN AND A GOLF PUTT MODELLING SYSTEM

[75] Inventors: Boris Yamrom, Schenectady; William E. Lorensen, Ballston Lake, both of N.Y.

[73] Assignee: General Electric Company, Schenectady, N.Y.

[21] Appl. No.: 559,879

[22] Filed: Jul. 27, 1990

[51] Int. Cl.$^5$ .............................................. G06F 3/14
[52] U.S. Cl. .................................. 395/161; 364/410; 340/724; 434/252; 434/307
[58] Field of Search ...................... 364/410, 518, 522; 434/307, 252; 273/DIG. 28, 185 B, 32 R, 32 H, 176 L, 176, 185 A, 185 R; 340/720-725; 395/161

[56] References Cited
PUBLICATIONS

Yamrom et al., X, Golf, and Object-Oriented Programming, GE Research and Development Center, Technical Information Series, 90CRD099, May, 1990.

Foley et al., Fundamentals of Interactive Computer Graphics, Addison-Wesley Publishing Company, 1982, pp. 245-266, 450-455, 505-536, and 575-590.

Elementary Numerical Analysis, Second Edition, McGraw-Hill Book Company, 1972, pp. 233-241, 327-372, and 373-387.

Primary Examiner—David L. Clark
Attorney, Agent, or Firm—Webb, II Paul R.; James C. Davis, Jr.

[57] ABSTRACT

The present user interface for a golf green and golf putt modelling system includes actuators which allow a user to select camera positions and illumination of a golf green. The user also may select, using the interface, a location of a golf ball and a golf cup on the green. The interface also displays the path trajectories of the golf ball on the green.

18 Claims, 9 Drawing Sheets

```
e=9.109
y=14          y=16
30 7.652      30 7.611
32 7.785      32* 7.742
34 7.911      34 7.853
36* 8.097     36 7.976
38 8.163      38 8.091
40 8.301      40 8.218
42 8.422      42 8.332
44* 8.535     44 8.441
46 8.603      46 8.555
48 8.672      48* 8.643
50 8.768      50 8.694
52 8.911      52 8.821
```

USER INTERFACE FOR A GOLF GREEN AND A GOLF PUTT MODELLING SYSTEM

A portion of this disclosure of this patent document contains material which is subject to copyright protection. The copyright owner has no objection to the fascimile reproduction by anyone of the patent document or the patent disclosure, as it appears in the Patent and Trademark Office patent file or records, but otherwise reserves all copyright rights whatsoever.

The present invention relates to a user interface, and more specifically, relates to a user interface for facilitating interaction between a system user and a golf green/golf putt modelling system.

RELATED APPLICATIONS

The present application is related to commonly assigned, copending U.S. patent application Ser. Nos. 07/546,623 (RD-19,077), 07/546,272 (RD-20,241 and 07/546,282 (RD-20,242), respectively, entitled System For Three-Dimensional Display of a Golf Green, System For Three-Dimensional Display of a Golf Putt and System For Three-Dimensional Display of a Golf Green Putting Difficulty Map.

BACKGROUND OF THE INVENTION

A golf green is an area of short grass typically bounded by a fringe area. The fringe area is a grassy area wherein the grass is taller than the grass which forms the green. The fringe area is more resistant to ball movement than the green. Somewhere within the green area, a cup is placed. The cup has a diameter larger than the diameter of a golf ball, and the opening of the cup is disposed at ground level. More particularly, a plane parallel to the cup opening typically is parallel to the portion of the green immediately adjacent the cup, and the cup is substantially disposed within the ground.

There are no physical objects, e.g., trees, on the green, however, a green surface typically has slopes and/or a variety of topographies. A golfer, therefore, can "sink a putt", i.e., putt a golf ball in the cup, from any point on a green so long as the golfer properly compensates for the green's topography. Compensating for green topography by proper selection of ball direction and velocity is the challenge facing a golfer in a putting context.

Many people familiar with the sport of golf believe that golf tournaments often are determined by putting on a green. Indeed, a golfer's putting performance usually is critical to winning a golf tournament.

To bring golf tournaments to television viewers, television networks such as the National Broadcasting Company strategically locate cameras throughout a golf course. Around the golf greens, and in order to avoid interfering with fans in stands around the green, cameras typically are placed at an elevation above the green and above the fans.

The imaged topography of a golf green which can be provided by cameras placed high above a green differs significantly from an actual golf green topography seen by a golfer. In most viewing situations, an image created by a camera disposed high above the green shows the golf green as a flat surface. A golf green, however, typically has many subtle variations that affect the roll, i.e., speed and direction, of the putted golf ball. The "flat green" TV image can result from a combination of diffuse lighting from the sun and high camera angles. As a result of the "flat green" TV image, it is almost impossible for a TV viewer to visualize the actual topography of a green and curvature of a putt on the green.

It is therefore an object of the present invention to provide a user interface for a golf green and golf putt modelling system.

SUMMARY OF THE INVENTION

The present user interface for a golf green and golf putt modelling system includes actuators which allow a user to select camera positions and illumination of a golf green. The user also may select, using the interface, a location of a golf ball and a golf cup on the green. The interface also displays the path trajectories of the golf ball on the green. Copending and commonly assigned patent applications describe display of a golf green, golf putt, and a golf green putting difficulty map. The present invention is specifically directed to a user interface which may be utilized with those systems.

The present user interface provides a user with flexibility in selecting cup and ball position and also provides a user with flexibility to select illumination and camera position around the green.

BRIEF DESCRIPTION OF THE DRAWINGS

These and other objects of the present invention, together with further features and advantages thereof, will become apparent from the following detailed specification when read together with the accompanying drawing, in which.

DETAILED DESCRIPTION OF THE DRAWINGS

Figure 1:
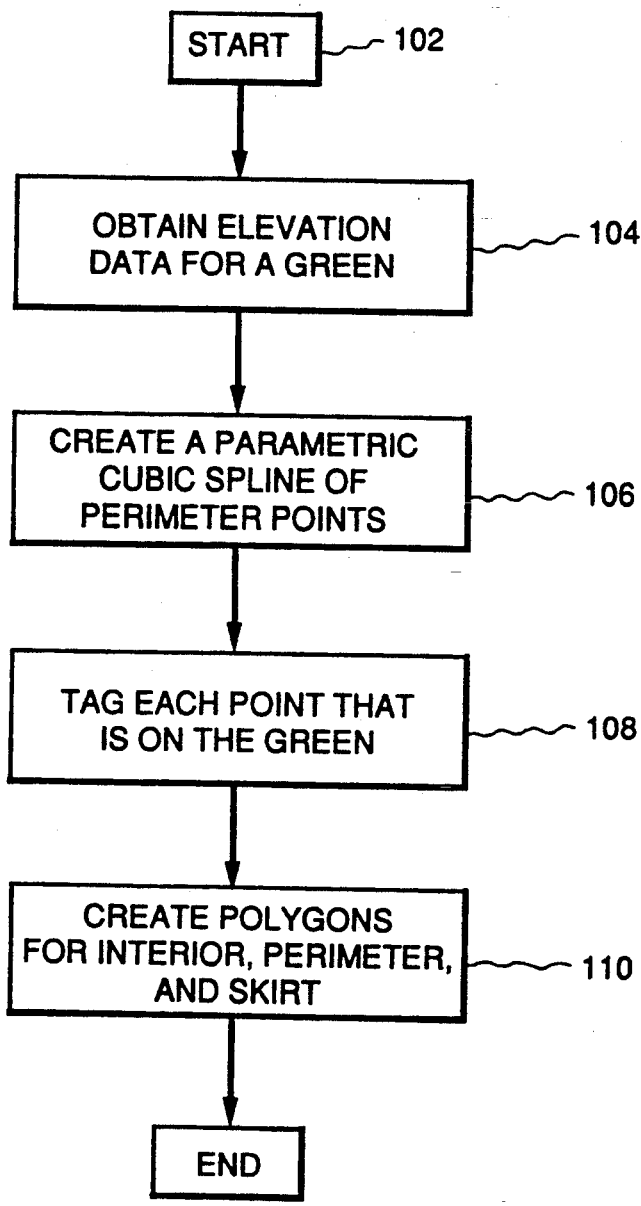
FIG. 1 is a flow chart representing a sequence of method steps for generating a three-dimensional image of a golf green.
Figures 2, 4:
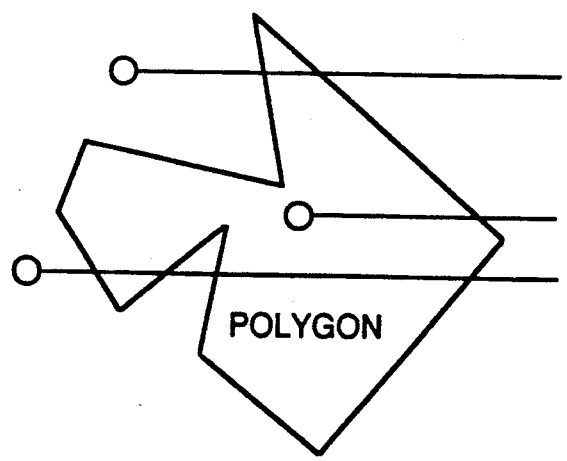
FIG. 2 is an example of a file containing golf green elevation and position data.
FIG. 4 illustrates a test for determining whether a point is inside a polygon.

Referring now more particularly to the drawings, FIG. 1 is a flow chart 100 illustrating a sequence of process steps for generating a 3-D image of a golf green. More particularly, subsequent to starting operations as indicated at 102, elevation information for the golf green must be acquired as indicated at a step 104. To obtain the elevation information, surveyors, using a theodolite, may measure elevation of points laid out on a uniform grid on the green. The x,y locations of the perimeter of the green also are measured. The elevation data may be obtained, for example, in two foot intervals. The data are then entered into an ASCII computer file. An example of such a file is shown in FIG. 2. The elevation and perimeter data, of course, may be obtained in many other ways.

Figure 3A:
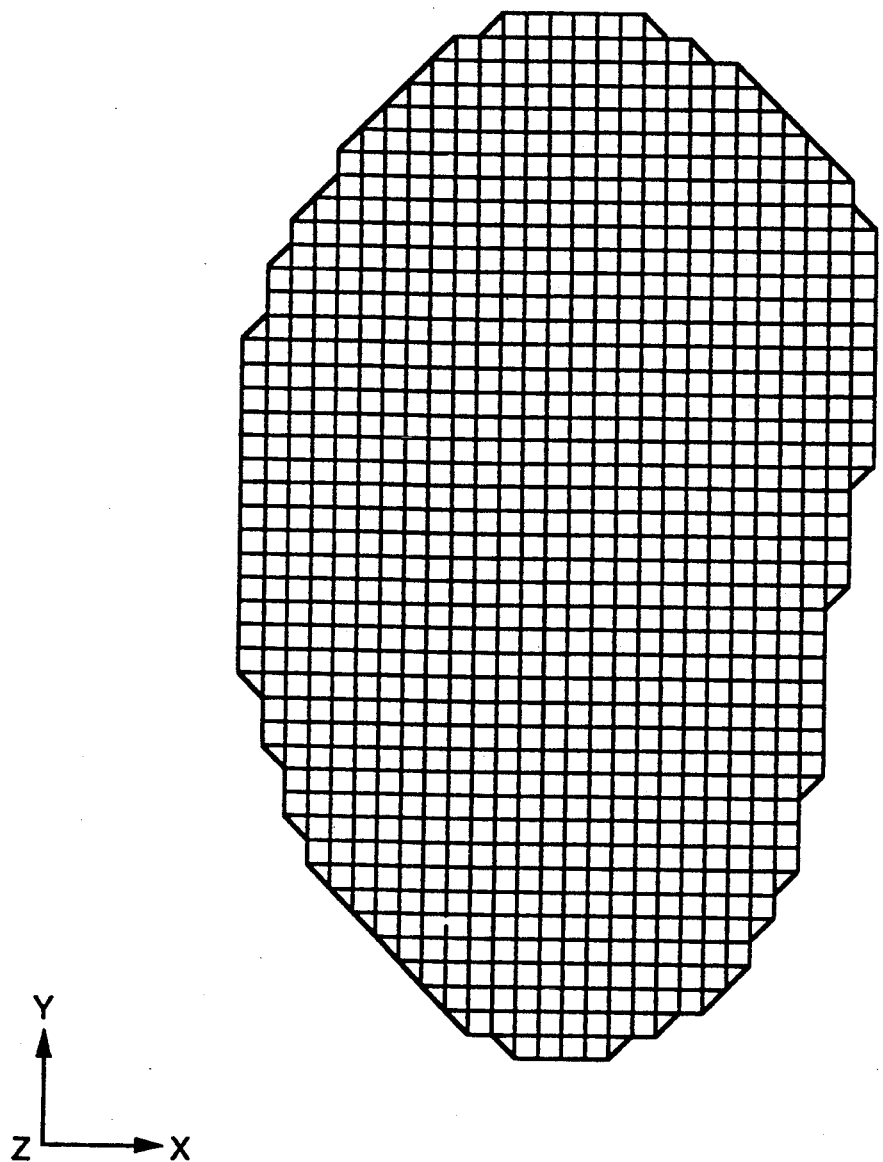
FIGS. 3A-B illustrate interior points of a golf green.
Figure 3B:
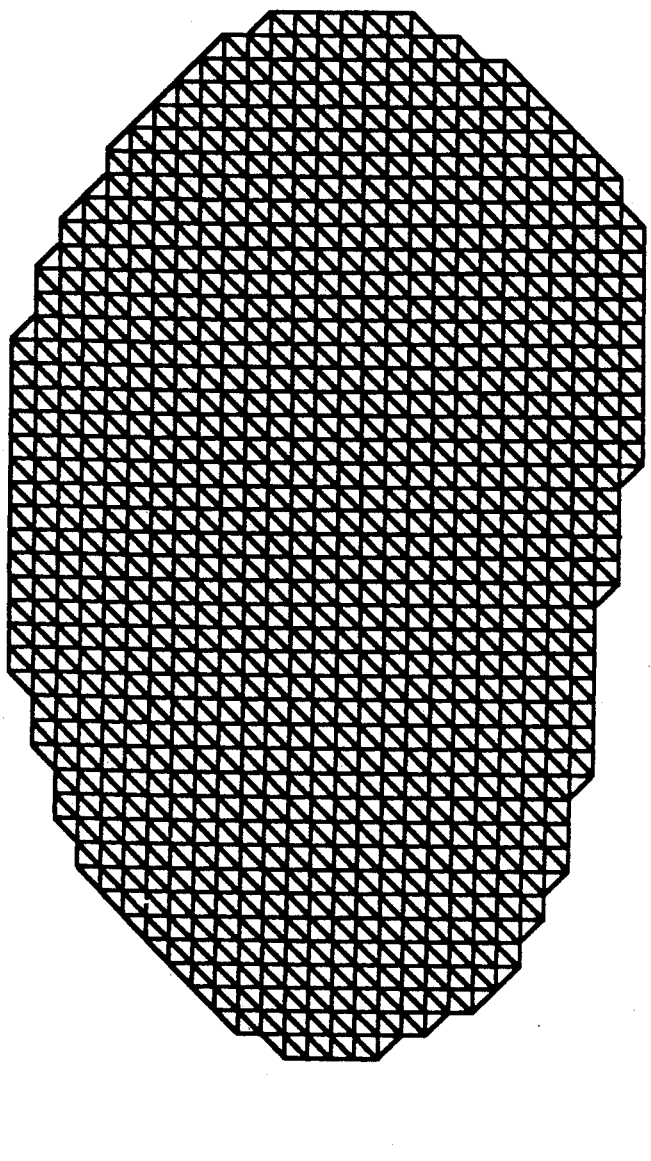

Once the elevation data and green perimeter data is obtained, operations continue to produce, on a computer display, a set of connected polygons representing the surface of the golf green. Examples of connected polygons for interior points are shown in FIGS. 3A-B.

Using polygons to represent three-dimensional shapes is discussed in Foley et al., "Fundamentals of Interactive Computer Graphics", Addison-Wesley Publishing Company, 1982, at pgs. 505-536, which pages are incorporated herein by reference. In FIG. 3A, the polygons are quadrilaterals whereas in FIG. 3B the polygons are triangles. Polygons also may be produced for a skirt around the green. The skirt, which may be imaged as vertical polygons that follow the green perimeter, enhances the 3-D image of the green. The following steps create the polygonal model from the elevation and perimeter data.

As indicated at 106 in FIG. 1, a parametric cubic spline operation is performed on the perimeter points. Parametric cubic spline techniques are well-known and typically are utilized for creating a smooth curve between points. Cubic spline techniques, for example, are set forth in Elementary Numerical Analysis, Second Edition, McGraw-Hill Book Company, 1972, at pgs. 233-241, which pages are incorporated herein by reference, and in the above incorporate pages from "Fundamentals of Interactive Computer Graphics".

Next, as indicated at a step 108, each point that is on the green is tagged. The points are tagged by checking each point against the perimeter polygon created in step 106. To find whether a point is inside a polygon, a ray from the point in question to a point at infinity, in say, the x direction is created. The number of times the ray intersects the edges of the polygon is counted, and if the ray intersects the edges of the polygon an even number of times, the point in question is outside the polygon. If the ray intersects the edges of the polygon an odd number of times, the point in question is an interior point. FIG. 4 shows three points, two outside the polygon and one inside the polygon.

Figure 5:
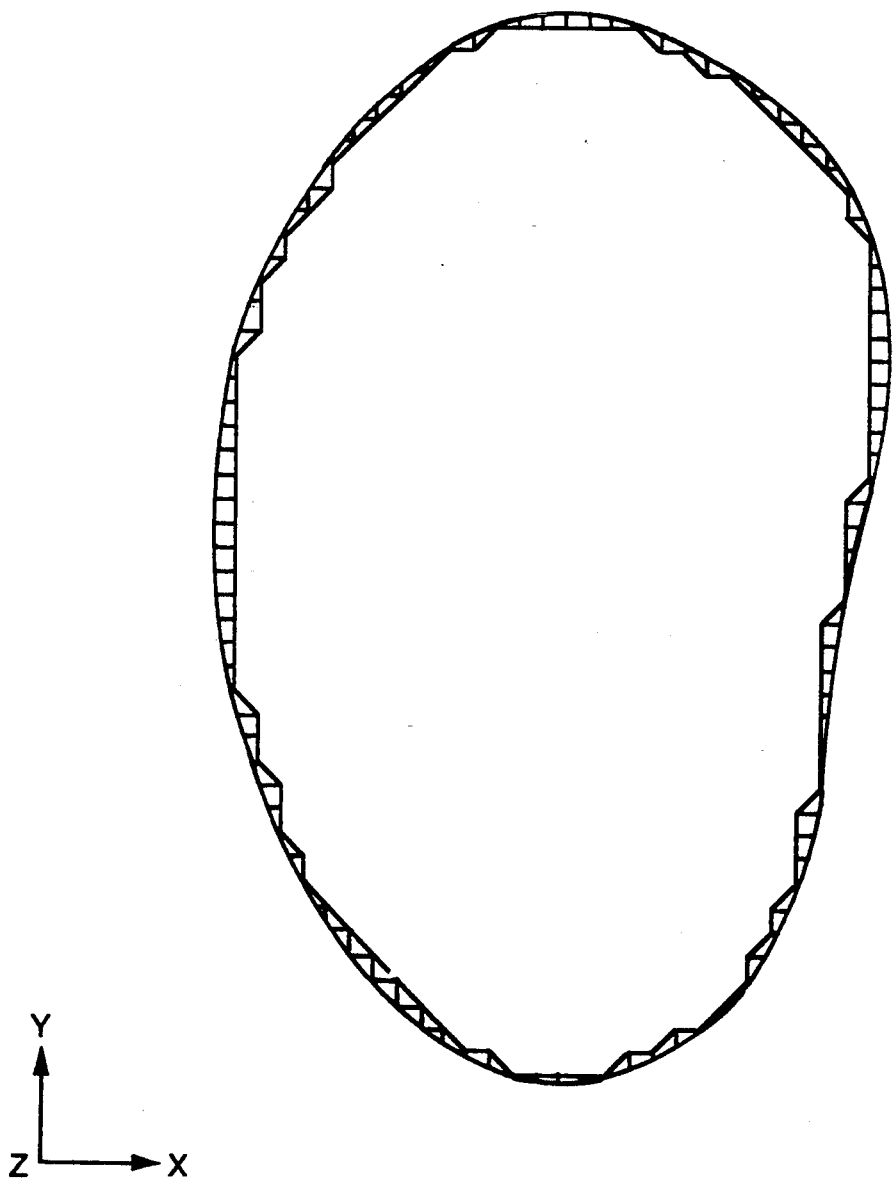
FIG. 5 illustrates perimeter polygons for a golf green.
Figure 6:
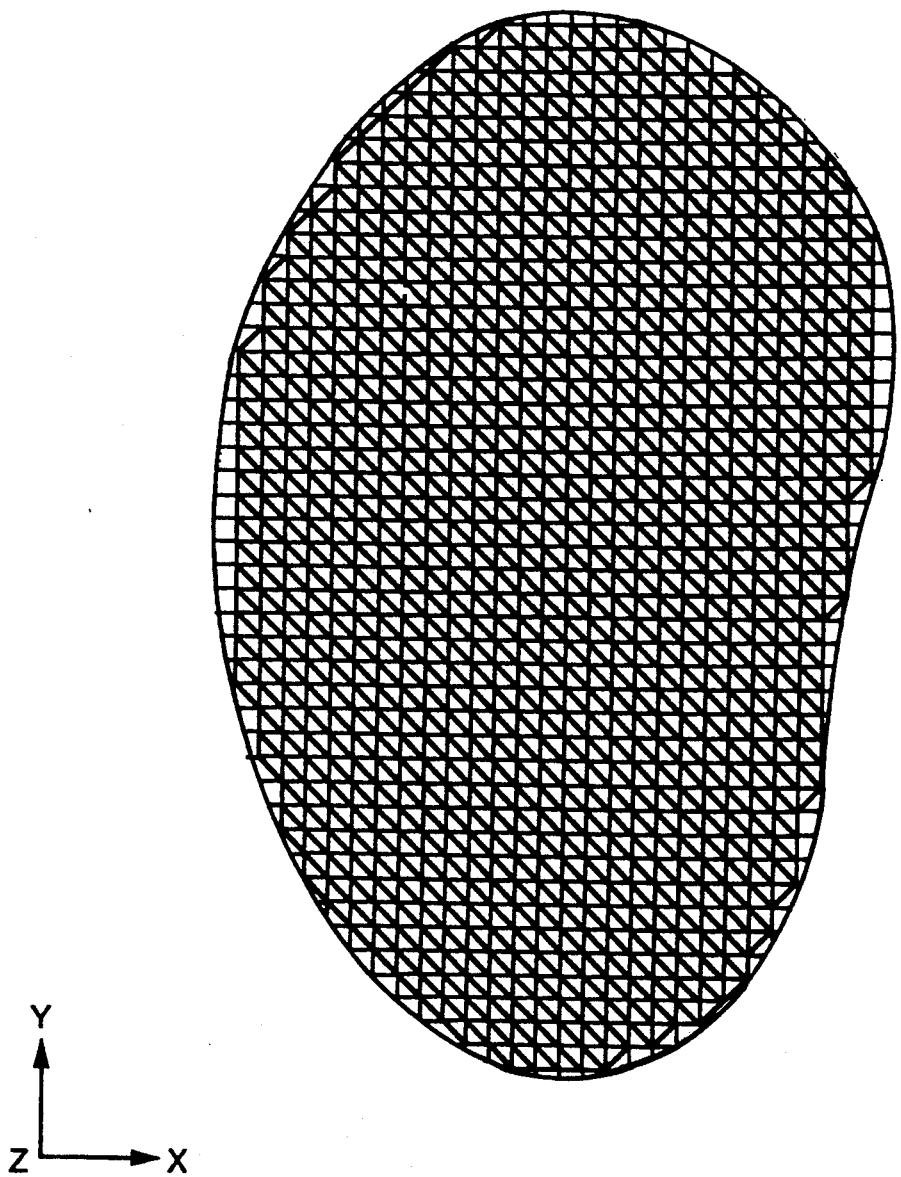
FIG. 6 illustrates interior and perimeter points of a golf green.

Once it is known which points are on the green and which points are off the green, polygons for interior, perimeter, and skirt points are created as indicated at a step 110. Interior polygons are points which have all their points inside the perimeter while perimeter polygons have some points inside and some outside the perimeters. Interior polygons are created from the interior points at higher quadrilaterals or triangles such as shown in FIGS. 3A-B. Perimeter and skirt polygons are clipped against the survey-provided perimeter data. Clipping algorithms are well-known such as the clipping algorithm set forth in Pavlidis, Algorithms For Graphics and Image Processing, Computer Science Press, 1982, beginning at page 338. Polygon clipping also is described in the hereinabove referenced "Fundamentals of Interactive Computer Graphics", at pgs. 450-455, which are incorporated herein by reference. Perimeter polygons are shown in FIG. 5 and a green model with both interior and perimeter points is shown in FIG. 6.

The perception of depth, i.e., elevation changes, on a physical display screen may accomplished by a combination of techniques. Simulated light sources can be arbitrarily placed at various locations around the golf green and the light intensity from these sources calculated in quantitative form. Shadows cast by the surface polygons when illuminated by light sources add realism by producing a sense of depth. Constant shading calculates a single light intensity value for shading an entire polygon. To produce a more "smooth" shaded surface, a technique known as Gouraud shading, which interpolates the light intensity across an individual polygon, also may be used. Texture mapping also provides additional golf green realism by creating a "grass" look. The combination of light sources, shading techniques, and texture mapping provides an improved image of the green topography. These and other shading techniques are described in "Fundamentals of Interactive Computer Graphics" at pgs. 575-590, which pages are incorporated herein by reference.

Figure 7A:
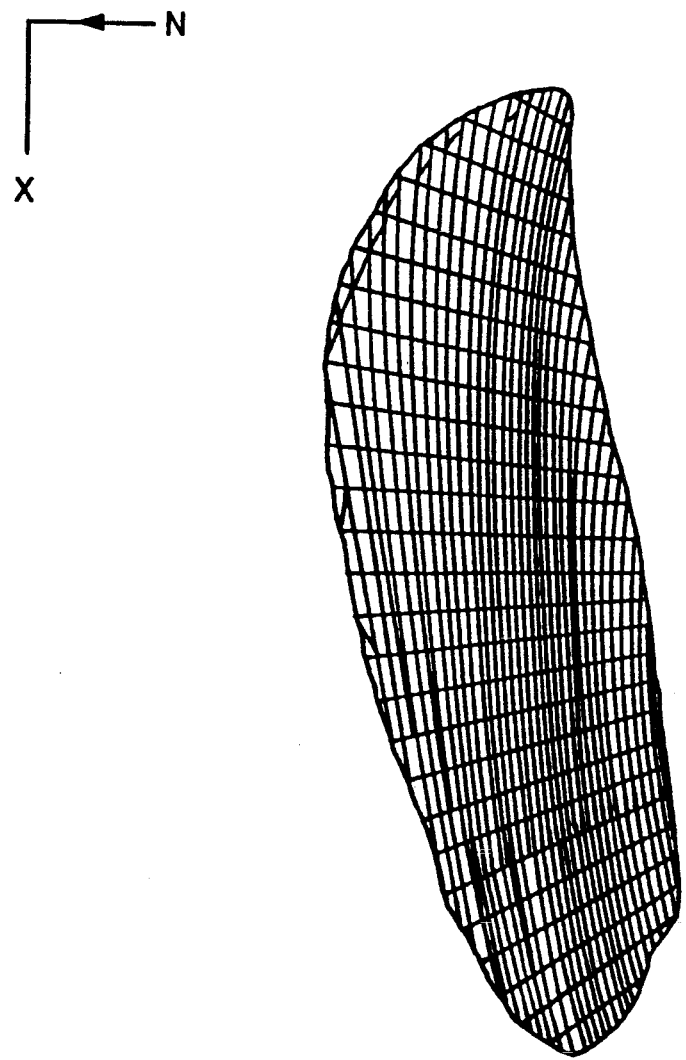
FIGS. 7A-B illustrate perspective views of a golf green.
Figure 7B:
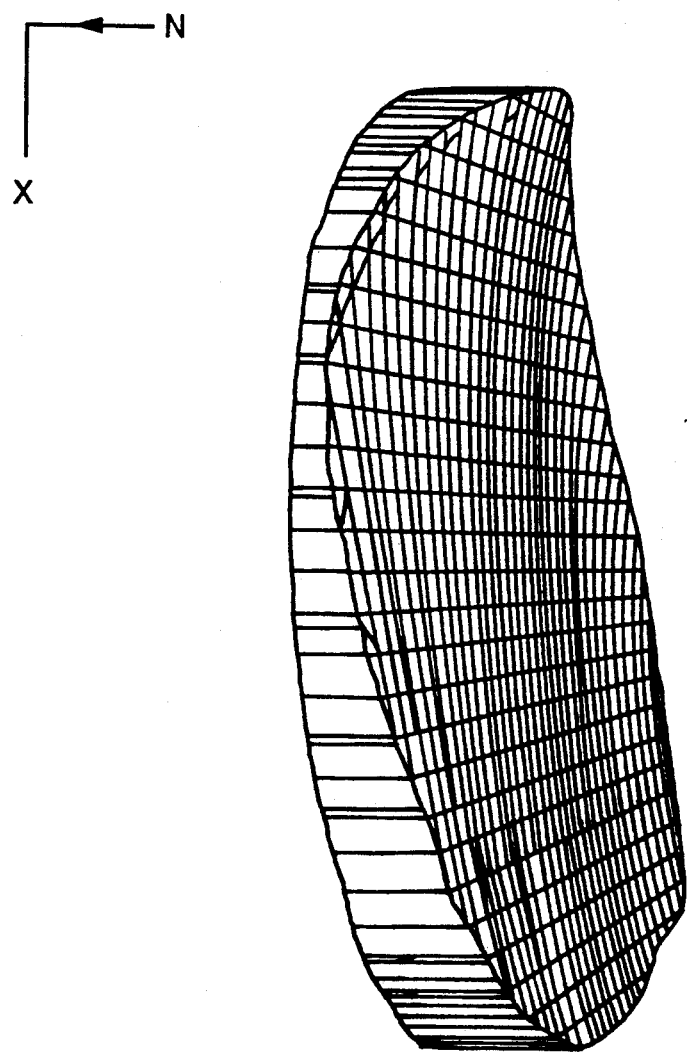

Flybys from a tee, over a fairway, then to a green, i.e., a ball's eye view, may be utilized to give a viewer a feel for a green's relative orientation to the tee. Moving around the green with the simulated camera, lets the viewer study the green's complex topography. The simulated camera can be placed at the player's ball location to show the viewer what the player is seeing. Movement around a green, a tee, and a fairway may be activated using well-known techniques such as transformation matrices described in "Fundamentals of Interactive Computer Graphics" at pgs. 245-266, which pages are incorporated herein by reference. Using transformation matrices, the relative perspective of a green may also be changed as illustrated in FIG. 7A without a skirt and in FIG. 7B with a skirt.

In an actual implementation, two input files were created for a golf greens: an elevation file and a perimeter file. The elevation file contained survey readings at two foot intervals. For a constant y, the x elevations were contained in the file with the first and last on-green points denoted by an asterisk (*). The base elevation can be changed at any time using the e=keyword in the file.

A format of the elevation file is as follows:
e=13.369 sets reference elevation
y=6 sets current y coordinate
24 8.409 gives x and elevation
36*9.357 gives x and elevation. The * indicates that this is either the first or last point on the green for a given y reading.

The format of the perimeter file is as follows:
n×x y where n is the point # and x,y are the coordinates of the perimeter point.

Two geometry output files were created: one maintaining the polygons for the golf green itself and another containing polygons for a skirt around the green. The skirt starts at the edge of the green and extends in the negative z direction to z=0. The skirt adds 3-D cues to the golf green representation. A scalar file is also created that has the elevations as the scalar parameters.

The polygon representation of the green can be displayed on a conventional 3-D graphics rendering device. Graphics workstations such as a Stellar GS 2000, a HP 9000S300, or a Sun workstation, may be utilized.

Figure 8:
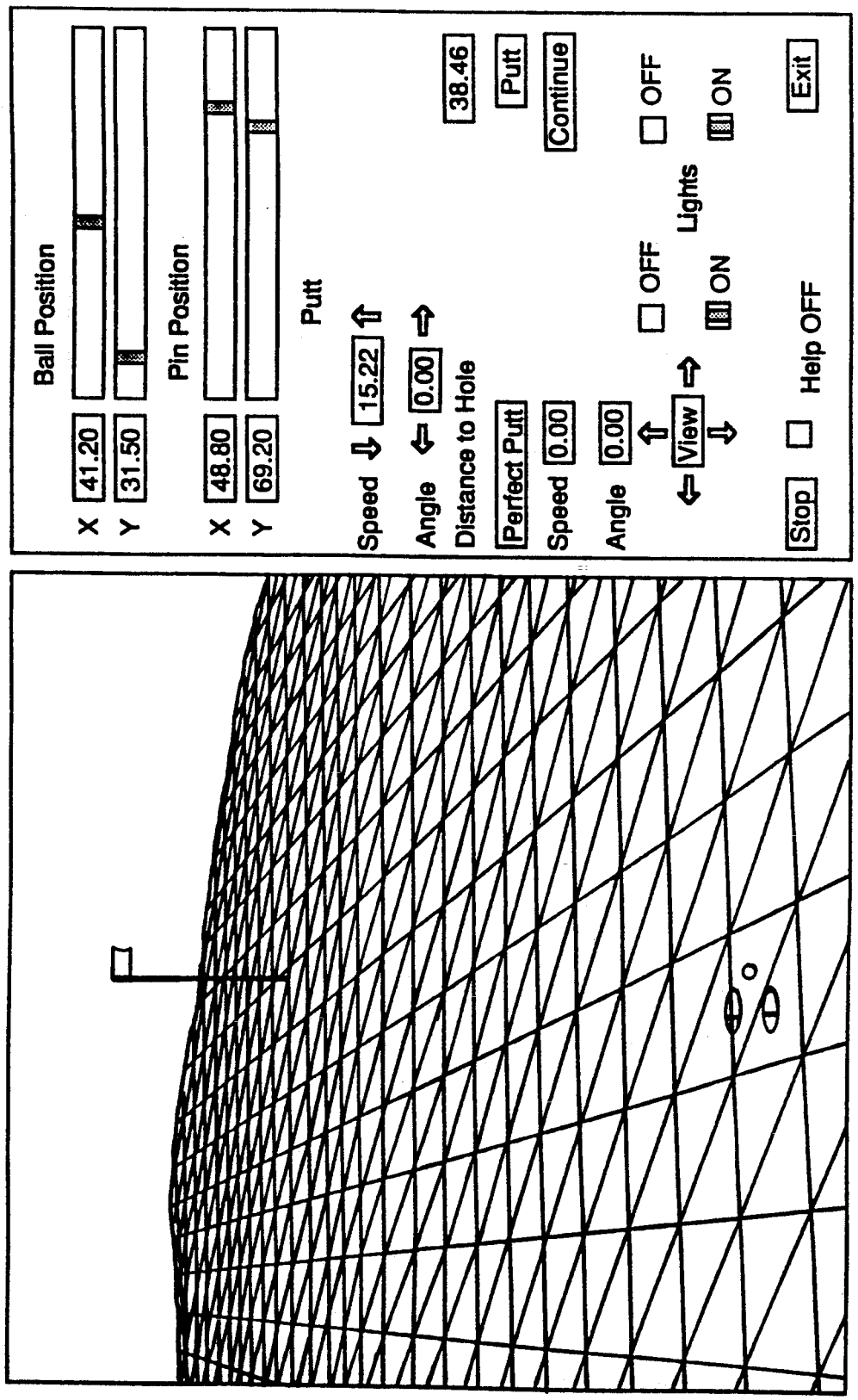
FIG. 8 illustrates a user interface in accordance with the present invention.

A computer graphics interface, in accordance with the present invention, provides user interface "widgets" on a computer display which are attached to "actions", i.e., lists of statements in an interpreted language, such that when an appropriate widget is selected by the pointing device (a mouse), the associated "actions" are fired, or executed. The user interface screen and controls are shown in FIG. 8. An example of a widget is the slider or ball or pin position. The left window displays the wireframe display of a green, a ball, and a pin with a flag. It also displays footprints and a putter head besides the ball. The right window is a control panel.

The green can be viewed from different points in space by a virtual camera that is controlled by a pointing device (a mouse). The rest of the interactions are performed through the control panel on the right. Using various widgets in this panel, the user can:

(1) Change the position of the ball on the green through its X and Y coordinate sliders.

(2) Change the position of the hole and the pin through X and Y coordinate sliders.

Whenever the ball or the hole position is changed, the virtual camera is placed in a natural player's position so that the ball and the hole are in the field of view. Three widgets immediately show suggested speed, direction, and distance from the ball to the hole.

(3) Change the initial putt speed and direction with arrow widgets. There are footprints and a putter head displayed beside the ball, thus each time direction is changed, the feet and the putter move accordingly. Zero direction corresponds to the straight line direction from the ball to the hole.

(4) Select "Putt" button and see the trajectory of the ball on the green that has been calculated based on the defined initial speed and direction.

(5) Select "Continue" button and see that the ball is placed at the end of a trajectory, and then the virtual camera is adjusted to the new position.

(6) Select "Perfect Putt" and watch as the boundary problem is solved using shooting method, which is hereinafter explained, with intermediate trajectories displayed while the solution is searched. When the solution is finally found, two text widgets display the chosen initial speed and direction. The user can change the speed and the direction data for the ball to be close to the perfect ones and can analyze the sensitivity of the solution to the initial conditions.

(7) Select four predefined viewing positions by using arrows in the viewing subpanel. Possible choices are one step to the left, one step to the right, bending the knees position, and looking from above.

(8) Change illumination by turning on and off toggles corresponding to four lights placed in the corners of a rectangle around the green.

(9) Select "Stop" button and enable direct message communication with the system's parser via standard input.

(10) Toggle "Help" button. In help mode the user sees user interface descriptions in a separate pop-up window while moving the pointer over the widgets.

(11) Select "Exit" button to terminate the simulation.

The user interface is implemented in the C programming language on a Stellar graphics computer. The window-based user interface widgets are implemented with the HP X widget set.

Once a mathematical description of the green surface is provided as described above, the motion of the golf ball on the green can be predicted. More particularly, knowing the velocity and direction of the ball, the final ball location can be predicted. The optimum putting velocity and direction to putt the ball into the hole can also be provided.

More particularly, assume that a green surface is defined in 3-D coordinate space by the equation:

$$z = s(x, y), \quad (1)$$

where z is the altitude of a surface point and x and y are plane coordinates of its projection on horizontal plane. In this notation, the horizontal plane will have equation $S(x,y) = $ const. for all x and y. A sliding body, which may be modeled as having no dimensions, i.e. a geometrical point, will be susceptible to three forces, namely, its weight P, the normal reaction of surface N, and friction Fr. For the resulting force F, the Second Newtonian law of motion provides:

$$am = F, \quad (2)$$

where a is acceleration of the body and m is its mass. Let $n = n(x,y,z)$ be a normal vector to the surface s at a point (x,y,z), where z is equal to s(x,y). Several relations hold for forces P, N, and Fr. First, $$N = -<P*n>n, \quad (3)$$

where $<a*b>$ notation is used for scalar product of two vectors a and b. This is true because of Third Newtonian Law (this force is opposite to the force of body pressure on surface). Secondly, Fr is equal to:

$$Fr = k|N|V/|V|, \quad (4)$$

where k is friction coefficient, $|N|$ is the length of a vector N, and V is velocity vector. Literally, friction force is proportional to normal reaction, coefficient of friction, and its direction is opposite to velocity vector. Now, rewrite $am = F$ in the form:

$$am = P - <P*n>n - k|N|V/|V|. \quad (5)$$

To arrive at a convenient form, transform previous vector notation into coordinate notation. Let $a = (a_x, a_y, a_z)$, $n = (n_x, n_y, n_z)$, $V = (v_x, v_y, v_z)$, and $P = (0, 0, -mg)$ (remember that P is directed vertically down and z axes is up, here g is acceleration of free fall). Now, after elimination of m, the last vector equation can be presented by three equations for each coordinate component:

$$a_x = n_z g n_x - [k(n_z g) v_x]/\sqrt{v_x^2 + v_y^2 + v_z^2} \quad (6)$$

$$a_y = n_z g n_y - [k(n_z g) v_y]/\sqrt{v_x^2 + v_y^2 + v_z^2} \quad (7)$$

$$a_z = n_z g n_z - [k(n_z g) v_z]/\sqrt{v_x^2 + v_y^2 + v_z^2} \quad (8)$$

Equations (6)-(8) now can be transformed to a first order system. Assume that an independent variable is time t and position of a body, e.g., a golf ball, is $(x_1, x_2, x_3)$. For a velocity $(v_x, v_y, v_z)$, the following will provide a solution for variables $(x_4, x_5, x_6)$:

$$x_1' = x_4 \quad (9)$$

$$x_2' = x_5 \quad (10)$$

$$x_3' = x_6 \quad (11)$$

$$x_4' = g n_z n_x - (k g n_z x_4)/\sqrt{x_4^2 + x_5^2 + x_6^2} \quad (12)$$

$$x_5' = g n_z n_y - (k g n_z x_5)/\sqrt{x_4^2 + x_5^2 + x_6^2} \quad (13)$$

$$x_6' = g n_z n_z - (k g n_z x_6)/\sqrt{x_4^2 + x_5^2 + x_6^2} \quad (14)$$

The symbol "'" is used to indicate derivative.

Using the above differential equations, an initial value problem can be solved. That is, given an initial velocity and direction, and given the initial position, i.e., x-y coordinates, of the golf ball on the green, the ball trajectory and the final position of the golf ball on the green can be determined and displayed. Initial value problems are discussed in Elementary Numerical Analysis, Second Edition, McGraw-Hill Book Company, 1972, at pgs. 327–372, which pages are incorporated herein by reference.

The above equations also provide that a boundary value problem can be addressed. That is, knowing the initial placement of the golf ball and hole, determine a direction and velocity for the ball so that the ball's final position is in the cup. Boundary value problems also are discussed in Elementary Numerical Analysis at pgs. 373–387, which pages are incorporated herein by reference. In the present system, the system makes an initial guess If the green is not flat, the initial guess, of course, will not result in a successful putt, i.e., the ball will not be in the cup. The present system then automatically determines a next direction and velocity for another attempt. For example, if the initial guess resulted in the ball's final position being to the right and short of the cup, the system will make a next guess where the ball direction is incrementally changed to the left of the cup and at an incremental increase in velocity. A ball final position is determined for this next guess.

The process continues until the ideal putt is found. If the ideal putt is not found after a predetermined number of tries, the present system will flatten the green by one half, and the process continues until the ideal putt for a half flat green is found. Once this putt is found, the green topography is scaled back with the initial guess being the ideal putt for the flattened green.

In this manner, the system continues to iterate through putt attempts until the ideal putt is found. Since the process is performed on a computer, the actual time required to perform the process is short.

A source code listing for the user interface and including generating a 3-D display of a golf green and a golf putt is provided in Appendix A. The syntax for the source code listing is as follows:

| statement | := object messages ';' |
|---|---|
| object | := NAME |
| messages | := message |
| | \| messages message |
| message | := PREFIX na_selector |
| na_selector | := "?" \| "!" |
| selector | := "=" \| "+" \| "–" \| "*" \| "/" \| " " \| ":" \| "@" \| "#" |
| argument | := VALUE |
| | \| NAME |
| | \| STRING |
| | \| "(''argument_list'')" |
| | \| "['object messages']" |
| argument_list | := argument |
| | \| argument_list","argument |

Once interpreted, i.e., executed, in accordance with the above syntax, and compiled in a particular computer system such as a Sun workstation, the source code listings provided in the attached appendix can be utilized for controlling operations of the computer system in accordance with the present invention.

While a preferred embodiment has been illustrated and described herein, it will be obvious that numerous modifications, changes, variations, substitutions and equivalents, in whole or in part, will now occur to those skilled in the art without departing from the spirit and scope contemplated by the invention. Accordingly, it is intended that the invention herein be limited only by the scope of the appended claims.

```
/*  (c) Copyright 1990 General Electric Company */
/*
 * window attributes stuff
 ***********************************************************/
/* Gravity values for setting attributes. */ scalar new: UnmapGravity    =  0;  /* window gravity */
scalar new: ForgetGravity   =  0;  /* bit gravity */
scalar new: NorthWestGravity =  1;
scalar new: NorthGravity    =  2;
scalar new: NorthEastGravity =  3;
scalar new: WestGravity     =  4;
scalar new: CenterGravity   =  5;
scalar new: EastGravity     =  6;
scalar new: SouthWestGravity =  7;
scalar new: SouthGravity    =  8;
scalar new: SouthEastGravity =  9;
scalar new: StaticGravity   = 10;

scalar new: NotUseful       =  0;
scalar new: WhenMapped      =  1;
scalar new: Always          =  2;

/***********************************************************
 * graphics context stuff
 ***********************************************************/
```

/* functions (really defined in hex instead of decimal in X */

```
scalar new: GXclear =            0;
scalar new: GXand =              1;
scalar new: GXandReverse =       2;
scalar new: GXcopy =             3;
scalar new: GXandInverted =      4;
scalar new: GXnoop =             5;
scalar new: GXxor =              6;
scalar new: GXor =               7;
scalar new: GXnor =              8;
scalar new: GXeqiv =             9;
scalar new: GXinvert =           10;
scalar new: GXorReverse =        11;
scalar new: GXcopyInverted =     12;
scalar new: GXorInverted =       13;
scalar new: GXnand =             14;
scalar new: GXset =              15;
```

/* LineStyle */

```
scalar new: LineSolid =          0;
scalar new: LineOnOffDash =      1;
scalar new: LineDoubleDash =     2;
```

/* capStyle */

```
scalar new: CapNotLast =         0;
scalar new: CapButt =            1;
scalar new: CapRound =           2;
scalar new: CapProjecting =      3;
```

/* joinStyle */

```
scalar new: JoinMiter =          0;
scalar new: JoinRound =          1;
scalar new: JoinBevel =          2;
```

/* fillStyle */

```
scalar new: FillSolid =               0;
scalar new: FillTiled =               1;
scalar new: FillStippled =            2;
scalar new: FillOpaqueStippled =      3;
```

/* fillRule */

```
scalar new: EvenOddRule =        0;
scalar new: WindingRule =        1;
```

/* subwindow mode */

```
scalar new: ClipByChildren =     0;
scalar new: IncludeInferiors =   1;
```

/* arc modes */

```
scalar new: ArcChord =           0;
```

```
scalar new: ArcPieSlice  =       1;

/* CoordinateMode for drawing rountines */ scalar new: CoordModeOrigin   =  0; /* relative to origin */
scalar new: CoordModePrevious =  1; /* relative to previous point */ scalar new: Complex    =         0; /* specify this if you are unsure */
scalar new: NonConvex  =         1;
scalar new: Convex     =         2;

/****************************************************************
 * Colormap stuff
 ****************************************************************/ scalar new: AllocNone  = 0;
scalar new: AllocAll   = 1;

/* really defined by shifting bits */
scalar new: DoRed   =    1;
scalar new: DoGreen =    2;
scalar new: DoBlue  =    4;

/* ui_mouse button masks - from <X11/X.h> */
— scalar new: ShiftMask   = 1;
— scalar new: ControlMask = 4;
— scalar new: Button1Mask = 256;
— scalar new: Button2Mask = 512;
— scalar new: Button3Mask = 1024;

/* X input masks from <X11/X.h> */
scalar new: NoEventMask              = 0;
scalar new: KeyPressMask             = 1;
scalar new: KeyReleaseMask           = 2;
scalar new: ButtonPressMask          = 4;
scalar new: ButtonReleaseMask        = 8;
scalar new: EnterWindowMask          = 16;
scalar new: LeaveWindowMask          = 32;
scalar new: PointerMotionMask        = 64;
scalar new: PointerMotionHintMask    = 128   ;
scalar new: Button1MotionMask        = 256   ;
scalar new: Button2MotionMask        = 512   ;
scalar new: Button3MotionMask        = 1024  ;
scalar new: Button4MotionMask        = 2048  ;
scalar new: Button5MotionMask        = 4096  ;
scalar new: ButtonMotionMask         = 8192  ;
scalar new: KeymapStateMask          = 16384;
scalar new: ExposureMask             = 32768 ;
scalar new: VisibilityChangeMask     = 65536 ;
scalar new: StructureNotifyMask      = 131072 ;
scalar new: ResizeRedirectMask       = 262144 ;
scalar new: SubstructureNotifyMask   = 524288 ;
scalar new: SubstructureRedirectMask = 1048576 ;
scalar new: FocusChangeMask          = 2097152 ;
scalar new: PropertyChangeMask       = 4194304 ;
scalar new: ColormapChangeMask       = 8388608 ;
scalar new: OwnerGrabButtonMask      = 16777216;
```

```
/* X events - from <X11/X.h> */
scalar new: KeyPress = 2;
scalar new: KeyRelease = 3;
scalar new: ButtonPress = 4;
scalar new: ButtonRelease = 5;
scalar new: MotionNotify = 6;
scalar new: EnterNotify = 7;
scalar new: LeaveNotify = 8;
scalar new: FocusIn = 9;
scalar new: FocusOut = 10;
scalar new: KeymapNotify = 11;
scalar new: Expose = 12;
scalar new: GraphicsExpose = 13;
scalar new: NoExpose = 14;
scalar new: VisibilityNotify = 15;
scalar new: CreateNotify = 16;
scalar new: DestroyNotify = 17;
scalar new: UnmapNotify = 18;
scalar new: MapNotify = 19;
scalar new: MapRequest = 20;
scalar new: ReparentNotify = 21;
scalar new: ConfigureNotify = 22;
scalar new: ConfigureRequest = 23;
scalar new: GravityNotify = 24;
scalar new: ResizeRequest = 25;
scalar new: CirculateNotify = 26;
scalar new: CirculateRequest = 27;
scalar new: PropertyNotify = 28;
scalar new: SelectionClear = 29;
scalar new: SelectionRequest = 30;
scalar new: SelectionNotify = 31;
scalar new: ColormapNotify = 32;
scalar new: ClientMessage = 33;
scalar new: MappingNotify = 34;

/* Golf objects */ vector new: initial_position dimension=3;
vector new: final_position dimension=3;
vector new: minus_final_position dimension=3;
scalar new: initial_speed;
scalar new: initial_angle;

vector new: ball_position dimension=3 = (50,40,0);
vector new: right_foot_init_position dimension=3 = (.5,0,0);
vector new: left_foot_init_position dimension=3 = (-.5,0,0);
vector new: left_foot_init_orientation dimension=3 = (0,180,0);

vector new: light1_position dimension=3 = (5,10,15);
vector new: light2_position dimension=3 = (5,100,15);
vector new: light3_position dimension=3 = (70,100,15);
vector new: light4_position dimension=3 = (70,10,15);
vector new: light_focal_point dimension=3 = (35, 60, 0);

vector new: pin_position dimension=3 = (47,72,0);
vector new: vec1 dimension=3;
vector new: vec2 dimension=3;
vector new: direction dimension=2;
```

```
scalar new: speed;
scalar new: angle;
scalar new: absolute_angle;
scalar new: relative_angle;
scalar new: sl;
scalar new: sx;
scalar new: sy;
scalar new: sz;

/* define cameras */ camera new:c1
        on!
        clipping_range=(.3,200);

c1 new:c1_left;
c1 new:c1_right;
c1 new:c1_up;
c1 new:c1_down;
camera new:c5
        focal_point=(40,60,0)
        position=(40,60,180)
        view_up=(0,1,0)
        clipping_range=(150,250)
        on!
;

/* define lights */ light new: l1
        intensity= 1
        on!
        position= light1_position
        focal_point= light_focal_point;

light new: l2
        off!
        intensity= 1
        position= light2_position
        focal_point= light_focal_point;

light new: l3
        off!
        intensity= 1
        position= light3_position
        focal_point= light_focal_point;

light new: l4
        off!
        intensity= 1
        position= light4_position
        focal_point= light_focal_point;

/* define renderer */ phigs new: aphigs
        cameras=c1 lights=[light instances?]
        background=(0.20,0.20,1)
        active_camera=c1
;
```

```
collection new:renderers members=(aphigs);

/* define models */ byu new: ball_model
        color= (1,1,1)
        geometry_file= ball.g;
byu new: hole_model
        color= (0,0,0)
        geometry_file= ball.g;
byu new: flag_model
        color= (1,1,0)
        geometry_file= flag.g;
byu new: pin_model
        color= (1,1,0)
        geometry_file= pin.g;
byu new: ground_model
        color= (.6,.9,.6)
        geometry_file= ground.g;
byu new: foot_model
        color= (1,1,1)
        geometry_file= foot.g;
byu new: putter_model
        color= (1,1,1)
        geometry_file= putter.g;
byu new: green_model
        geometry_file= mohawk4.g
        color= (.2,1,.2) gouraud!;

/* define actors */ actor new: ball
        color=(1,1,1)
        on!
        modeller= ball_model;
actor new: hole
        color=(0.1,0.1,0.1)
        on!
        modeller= hole_model
        scale=(3,3,.2);
actor new: flag color=(1,1,0)
        on!
        modeller= flag_model;
actor new: pin
        color=(1,1,0)
        scale=(2,2,1)
        on!
        modeller= pin_model;

actor new: ground
        color=(.6,.9,.6)
        modeller= ground_model
;

actor new: trajectory
```

```
        modeller= polyline
        position+ (0,0,0.15)
        color= (1,1,1);

actor new: green1
        modeller= green_model
        color=(0.2,1,0.2)
        on!;

collection new: pin_and_flag members=(flag, pin, hole);

/* define assemblies */ assembly new: right_foot
        color=(1,1,1)
        modeller= foot_model
        scale=(.020833, .020833, .020833)
        position= right_foot_init_position;

assembly new: left_foot
        color=(1,1,1) modeller= foot_model
        scale=(-.020833, .020833, .020833)
        position= left_foot_init_position;

assembly new: putter
        color=(1,1,1)
        modeller= putter_model;

assembly new:feet
        parts=(left_foot, right_foot, putter);

assembly new:my_feet parts=feet;

/* define trajectory */ phigs_polyline new: polyline width= 3;

/* define golf_green */ golf_green new: agreen
        green_file = "mohawk.4"
        prefix = mohawk1
        scale = 1
        elevations!
        normals!;

/* define solvers */ slider new: slider1
        surface = agreen
        friction= .16;

rkqc_solver new: solver1
        function= slider1
        eps = .01
        min_step = .00001
```

```
              speed_guard = .2
              data_capacity = 300
              data_min_step = .001
              guess_step = .01;

rk_shooter new: shooter1
              function= bv0
              start = 0 end = 4
              eps = .01
              min_step = .00001
              speed_guard = .2
              data_capacity = 300
              data_min_step = .001
              guess_step = .01;

- bv_slider new: bv0
              surface = agreen
              eps = 0.05
              delta = (.01, .01)
              friction = .16;

bv0 new: bv1;

/* define variables for solving initial and boundary value problems */ logic new:  log;
    vector new: current_score dimension = 2;
    vector new: last_score dimension = 2;
    scalar new: prev_scale = 0;
    scalar new: next_scale = 1;
    scalar new: current_scale = 1;
    scalar new: i1 = 0;
    scalar new: i2 = 0;
    scalar new: i3 = 0;

loop new: inner_loop
              duration = 60
              resolution = 1
              start_actions+ "! inner loop start"
              start_actions+ "i1 = 0;"          -- reset counter
              tick_actions+  "log nogreater:([current_score length?],
                              [last_score length?])
                              true: \"bv1 new: bv2;
                              bv0 new: bv1;
                              current_score new: \\"last_score\\";
                              current_score print: length;\";"

tick_actions+ "shooter1 end=30 shoot!; i1 + 1;"

/* this is used to display intermediate approximations */ tick_actions+ "shooter1 data:ball_data;"
              tick_actions+ "polyline data= ball_data modified!;"
              tick_actions+ "green1 scale=(1,1,[current_scale ?]);"
              tick_actions+ "aphigs render!;"
              tick_actions+ "current_score = [bv0 score?];"
```

```
/* end of display */ tick_actions+ "log greater: (.05, [current_score length?])
                        true: \"inner_loop time=10000;\";"
        tick_actions+ "log greater: ([current_score length?], 50)
                        true: \"bv0 init_speed = [bv2 init_speed?]
                        init_angle = [bv2 init_angle?];
                        inner_loop time=100;\";"
        end_actions+ "inner_loop time=0; i3 + i1;"
        end_actions+ "i1 print: value;"
        ;

loop new: outer_loop
        duration = 20
        resolution = 1
        start_actions+ "! outer_loop start"
        start_actions+ "i2 = 0; i3 = 0;"
        tick_actions+ "last_score = (20, 0); current_score = (20, 0);"
        tick_actions+ "agreen scale = current_scale elevations! normals!;
                        i2 + 1;"
        tick_actions+ "inner_loop start!;"
        tick_actions+ "log less: (i1, 61);
                        log and: (log, [log less: (20, [current_score length?])?])
                    true: \"current_scale + prev_scale / 2;\"
                    false: \"prev_scale = current_scale;
                      current_scale = next_scale;\";"
        tick_actions+ "log equal: (prev_scale, next_scale)
                        true: \"outer_loop time=20;\";"
        end_actions+ "!***********************"
        end_actions+ "outer_loop time=0;"
        end_actions+ "i2 print: value; i3 print: value;"
        ;

/* actions for perfect putt */ actions new: bv_actions
tick_actions+ "trajectory on!;"
tick_actions+ "bv0 init_speed = speed;"
tick_actions+ "prev_scale = 0; next_scale = 1; current_scale = 1;"
tick_actions+ "bv0 init_angle = angle;"
tick_actions+ "bv0 init_position = ball_position;"
tick_actions+ "bv0 final_position = pin_position;"
tick_actions+ "outer_loop start!;"
tick_actions+ "perfect_putt_speed_value title= [format = [bv0 init_speed?] ?];"
tick_actions+ "perfect_putt_angle_value title= [format = [s1 = [bv0 init_angle?] - angl
]?];";

/* User interface classes */ string new: format float_format= "%5.2f";
string new: speed_line;

ui
application= "Golf"  create!;
ui_control_panel new:   top_panel parent= ui;
ui_control_panel new:   golf_workspace_panel parent= top_panel;
ui_workspace new:       phigs_workspace parent= golf_workspace_panel;
ui_control_panel new:   golf_panel parent= top_panel;
ui_toggle new:          toggle_manipulator parent= golf_panel;
ui_button new:          reset_pin_and_ball parent= golf_panel;

ui_title new: title3 parent= golf_panel;
ui_title new: title_speed parent= golf_panel;
ui_arrow new: speed_arrow_left parent= golf_panel;
ui_title new: speed_value parent= golf_panel;
ui_arrow new: speed_arrow_right parent= golf_panel;
ui_title new: title_direction parent= golf_panel;
ui_arrow new: direction_arrow_left parent= golf_panel;
```

```
ui_title new: direction_value parent= golf_panel;
ui_arrow new: direction_arrow_right parent= golf_panel;
ui_button new: render parent= golf_panel;
ui_title new: title_distance_to_hole parent= golf_panel;
ui_title new: distance_to_hole_value parent= golf_panel;
ui_button new: golf_putt parent= golf_panel;
ui_button new: solve parent= golf_panel;
ui_title new: perfect_putt_speed parent= golf_panel;
ui_title new: perfect_putt_speed_value parent= golf_panel;
ui_title new: perfect_putt_angle parent= golf_panel;
ui_title new: perfect_putt_angle_value parent= golf_panel;
ui_button new: continue parent= golf_panel;
ui_control_panel new: view_panel parent= golf_panel;
ui_arrow new: view_up parent= view_panel;
ui_arrow new: view_left parent= view_panel;
ui_button new: view parent= view_panel;
ui_arrow new: view_right parent= view_panel;
ui_arrow new: view_down parent= view_panel;
ui_control_panel new: light_panel parent= golf_panel;
ui_toggle new: toggle_light1 parent= light_panel;
ui_toggle new: toggle_light2 parent= light_panel;
ui_title new: title5 parent= light_panel;
ui_toggle new: toggle_light3 parent= light_panel;
ui_toggle new: toggle_light4 parent= light_panel;
ui_button new: golf_stop parent= golf_panel;
ui_button new: golf_exit parent= golf_panel;
ui_toggle new: golf_help parent= golf_panel;
ui_font new: font;

collection new: ui_instances members=[ui instances?];

/* define colors */ ui_popup new: color_shell parent= ui create!;
ui_color new: col parent= color_shell create!;
scalar new: gold = [col color= "gold" pixel?];
scalar new: goldenrod = [col color= "goldenrod" pixel?];
scalar new: white = [col color= "White" pixel?];
scalar new: black = [col color= "Black" pixel?];
scalar new: green_yellow = [col color= "green yellow" pixel?];
scalar new: pink = [col color= "Pink" pixel?];
scalar new: blue = [col color= "blue" pixel?];
scalar new: forestgreen = [col color= "forest green" pixel?];
scalar new: seagreen = [col color= "sea green" pixel?];
scalar new: darkgreen = [col color= "dark green" pixel?];
scalar new: darkolivegreen = [col color= "dark olive green" pixel?];
scalar new: lightgrey = [col color= "light grey" pixel?];
scalar new: Aquamarine = [ui_color color= "Aquamarine" pixel?];
scalar new: Gray = [ui_color color= "Gray" pixel?];
scalar new: green = [col color= "green" pixel?];
scalar new: Plum = [ui_color color= "Plum" pixel?];
scalar new: Red = [ui_color color= "Red" pixel?];
scalar new: Tan = [ui_color color= "Tan" pixel?];
scalar new: Violet = [ui_color color= "Violet" pixel?];
scalar new: Wheat = [ui_color color= (.96078,.8706,.70919) pixel?];
scalar new: Yellow = [ui_color color= "Yellow" pixel?];
```

```
ui_instances
        @ "xOffset"           : 8
        @ "yOffset"           : 8
        @ "xAttachOffset"     : 8
        @ "yAttachOffset"     : 8
        @ "borderWidth"  : 2
        @ "font"         : [font font_name= "8x13bold" font?]
;

/* define collections of different widgets */ collection new: buttons members=[ui_button instances?];
collection new: toggles members=[ui_toggle instances?];
collection new: arrows members=[ui_arrow instances?];
collection new: titles members=[ui_title instances?];
collection new: sliders members=[ui_slider instances?];
collection new: control_panels members=[ui_control_panel instances?];
collection new: non_help_collection members=
        (
    title_speed
  , top_panel
  , golf_workspace_panel
  , phigs_workspace
  , golf_panel
  , light_panel
  , view_panel
  , title_direction
  , title2
  , title3
  , title4
  , title5
  , title_distance_to_hole
  , perfect_putt_speed
  , perfect_putt_angle
);

ui_instances members= [non_help_collection members?]
        enter_action= help;

ui_instances members=[ui instances?];

golf_workspace_panel
        @ "xRefName"      : "top_panel"
        @ "yRefName"      : "top_panel"
        @ "xAddWidth"     : 0
        @ "yAddHeight"    : 0
        @ "width"         : 850
        @ "height"        : 850
;
phigs_workspace
    enter_action= mouse_action
    exit_action= no_mouse_action
        @ "xRefName"      : "golf_workspace_panel"
        @ "yRefName"      : "golf_workspace_panel"
        @ "xAddWidth"     : 0
        @ "yAddHeight"    : 0
        @ "width"         : 850
        @ "height"        : 850
```

```
;
golf_panel
        @ "xRefName"      : "golf_workspace_panel"
        @ "yRefName"      : "top_panel"
        @ "xAddWidth"     : 1
        @ "yAddHeight"    : 0
        @ "yAttachBottom" : 1
        @ "yResizeable"   : 1
;

reset_pin_and_ball
        action= reset_pin_and_ball_action
        label= "Reset Pin & Ball"
        @ "xRefName"      : "golf_panel"
        @ "yRefName"      : "golf_panel"
        @ "xAddWidth"     : 0
        @ "yAddHeight"    : 0
;

actions new: reset_pin_and_ball_action
tick_actions+ "
                pin_position=(47,72,[agreen @ (47,72) z?]);
                ball_position=(50,40,[agreen @ (50,40) z?]);
                common_actions tick!;
                phigs render!;
";

toggle_manipulator
        label="Pin & Ball"
        state= 1
        on_action=pin_and_ball_actions
        off_action=camera_actions
        @ "xRefName"      : "golf_panel"
        @ "yRefName"      : "reset_pin_and_ball"
        @ "xAddWidth"     : 0
        @ "yAddHeight"    : 1
;

actions new: pin_and_ball_actions
        tick_actions+"
                toggle_manipulator label=\"Pin & Ball\";
                mouse
                button1= \"\"
                button2= pin_button
                button3= ball_button
                button1_shift= \"\"
                button2_shift= \"\"
                button3_shift= \"\"
                button1_control= \"\"
                button2_control= \"\"
                button3_control= \"\"
                ;
                aphigs cameras=c5 render!;
"
;
actions new: camera_actions
        tick_actions+"
                toggle_manipulator label=\"Camera\";
                mouse
                button1= button1
                button2= button2
                button3= button3
                button1_shift= button1_shift
                button2_shift= button2_shift
                button3_shift= button3
```

```
            button1_control= button1_control
            button2_control= button2_control
            button3_control= button3_control
            ;
            aphigs cameras=c1 render!;
        "
;

actions new: common_actions
tick_actions+ "speed upper = 25 upperoff!;"
tick_actions+ "speed = [vec1 = pin_position - ball_position length?] * 6 + 1 sqrt! upperon!;"
tick_actions+ "distance_to_hole_value title= [format = [vec1 length?] ?];"
tick_actions+ "speed_value title = [format = speed ?];"
tick_actions+ "angle atan2:([vec1 @2 ?], [vec1 @1 ?]);"
tick_actions+ "absolute_angle = angle;"
tick_actions+ "relative_angle = 0;"
tick_actions+ "direction_value title=[format = 0 ?];"
tick_actions+ "c1 focal_point= [pin_position?];"
tick_actions+ "c1 focal_point+ [vec2 = vec1 * -0.6 ?];"
tick_actions+ "c1 position= [ball_position?];"
tick_actions+ "c1 position+ [vec2 = vec1 * -0.5 + (0,0,5) ?];"
tick_actions+ "c1 view_up= (0,0,1);"
tick_actions+ "ball position= ball_position position+ (0,0,.1);"
tick_actions+ "pin_and_flag position= pin_position;"
tick_actions+ "position_feet tick!;"
tick_actions+ "trajectory off!;";

actions new: position_feet
tick_actions+ "c1_left focal_point= [pin_position?];"
tick_actions+ "c1_left position= [ball_position?];"
tick_actions+ "c1_left view_up= (0,0,1);"
tick_actions+ "my_feet position= [ball_position?];"
tick_actions+ "feet position= [vec2 = [c1_left u_axis?] ?];"
tick_actions+ "feet position+ (0,0,.1);"
tick_actions+ "feet up= [vec2 * -1 ?];";

title3
        title="Putt"
        @ "xRefName"      : "golf_panel"
        @ "yRefName"      : "toggle_manipulator"
        @ "yAddHeight"    : 1
        @ "xAttachRight"          : 1
        @ "xResizable"    : 1
;

title_speed
        title="Speed"
        @ "xRefName"      : "golf_panel"
        @ "yRefName"      : "title3"
        @ "yAddHeight"    : 1
;

speed_arrow_left
        action= speed_decrease
        down!
        @ "xRefName"      : "title_speed"
        @ "yRefName"      : "title3"
        @ "yAddHeight"    : 1
        @ "xAddWidth"     : 1
;
```

```
actions new: speed_decrease
tick_actions+ "speed * .99; speed_value title = [format = speed ?];";

speed_value
        title= "0.00"
        @ "xRefName"    : "speed_arrow_left"
        @ "yRefName"    : "speed_arrow_left"
        @ "xAddWidth"   : 1
        @ "yOffset"     : -2
        @ "width"       : 60
;

speed_arrow_right
        action= speed_increase
        up!
        @ "xRefName"    : "speed_value"
        @ "yRefName"    : "speed_value"
        @ "yOffset"     : 1
        @ "xAddWidth"   : 1
;

actions new: speed_increase
tick_actions+ "speed * 1.01; speed_value title = [format = speed ?];";

title_direction
        title="Angle"
        @ "xRefName"    : "golf_panel"
        @ "yRefName"    : "title_speed"
        @ "yAddHeight"  : 1
;

direction_arrow_left
        action= direction_decrease
        left!
        @ "xRefName"    : "title_direction"
        @ "yRefName"    : "title_speed"
        @ "xAddWidth"   : 1
        @ "yAddHeight"  : 1
;

actions new: direction_decrease
tick_actions+ "relative_angle + 0.5;"
tick_actions+ "direction_value title = [format = relative_angle ?];"
tick_actions+ "angle = absolute_angle + relative_angle;"
tick_actions+ "my_feet rotate_z: -0.5;";

direction_value
        title= "0.00"
        @ "xRefName"    : "direction_arrow_left"
        @ "yRefName"    : "direction_arrow_left"
        @ "xAddWidth"   : 1
        @ "yOffset"     : -2
        @ "xWidth"      : 60
;

direction_arrow_right
        action= direction_increase
```

```
                right!
            @ "xRefName"      : "direction_value"
            @ "yRefName"      : "direction_value"
            @ "xAddWidth"     : 1
            @ "yOffset"       : 1
    ;

actions new: direction_increase
    tick_actions+ "relative_angle - .5;"
    tick_actions+ "direction_value title = [format = relative_angle ?];"
    tick_actions+ "angle = absolute_angle + relative_angle;"
    tick_actions+ "my_feet rotate_z: 0.5;";

render
            action= render_action
            label= "Render"
            @ "xRefName"      : "golf_panel"
            @ "yRefName"      : "direction_value"
            @ "xAddWidth"     : 0
            @ "yAddHeight"    : 1
    ;

actions new: render_action
    tick_actions+ "aphigs render!;"
    ;

title_distance_to_hole
            title="Distance to Hole"
            @ "xRefName"      : "golf_panel"
            @ "yRefName"      : "render"
            @ "yAddHeight"    : 1
    ;

distance_to_hole_value
            title="0.00"
            @ "xRefName"      : "title_distance_to_hole"
            @ "yRefName"      : "render"
            @ "yAddHeight"    : 1
            @ "xAddWidth"     : 1
            @ "xWidth"        : 60
            @ "xAttachRight"  : 0
            @ "xVaryOffset"   : 0
    ;

golf_putt
            label="Putt"
            action=putt
            @ "xRefName"      : "golf_panel"
            @ "yRefName"      : "title_distance_to_hole"
            @ "yAddHeight"    : 1
            @ "xAttachRight"  : 0
            @ "xVaryOffset"   : 1
    ;
    actions new: putt
    tick_actions+ "slider1 speed = speed direction= ([s1 = angle cos?], [s1 = angle sin?]);"
    tick_actions+ "slider1 position = ball_position;"
    tick_actions+ "solver1 start = 0 end = [s1 = speed / 3 ?]  solve!; solver1 data:ball_data"
    tick_actions+ "polyline data= ball_data modified!;"
    tick_actions+ "trajectory on!;"
    tick_actions+ "aphigs render!;";

continue
            label="Continue"
```

```
            action=continue_putt
            @ "xRefName"    : "golf_panel"
            @ "yRefName"    : "golf_putt"
            @ "yAddHeight"  : 1
            @ "xAttachRight"      : 0
            @ "xVaryOffset" : 1
    ;
    actions new:continue_putt
    tick_actions+ "ball_position = [slider1 position?];"
    tick_actions+ "ball position = ball_position; aphigs render!;"
    tick_actions+ "common_actions tick!;"
    tick_actions+ "aphigs render!;"
    ;

solve
            label="Perfect Putt"
            action=bv_actions
            @ "xRefName"    : "golf_panel"
            @ "yRefName"    : "continue"
            @ "yAddHeight"  : 1
    ;

perfect_putt_speed
        title= "Speed"
        @ "xRefName"    : "golf_panel"
        @ "yRefName"    : "solve"
        @ "yAddHeight"  : 1
perfect_putt_speed_value
        title= "0.0"
        @ "xRefName"    : "perfect_putt_speed"
        @ "yRefName"    : "solve"
        @ "yAddHeight"  : 1
        @ "xAddWidth"   : 1
        @ "xWidth"      : 60
    ;

perfect_putt_angle
        title= "Angle"
        @ "xRefName"    : "golf_panel"
        @ "yRefName"    : "perfect_putt_speed"
        @ "yAddHeight"  : 1
    ;

perfect_putt_angle_value
        title= "0.0"
        @ "xRefName"    : "perfect_putt_speed"
        @ "yRefName"    : "perfect_putt_speed"
        @ "yAddHeight"  : 1
        @ "xAddWidth"   : 1
        @ "xWidth"      : 60
    ;

view_panel
        @ "xRefName"    : "golf_panel"
        @ "yRefName"    : "perfect_putt_angle"
        @ "yAddHeight"  : 1
        @ "xResizable"  : 1
    ;

view_up
        action= camera_up
        up!
```

```
        @ "xRefName"     : "view_panel"
        @ "yRefName"     : "view_panel"
        @ "xOffset"      : 45
        @ "xAttachRight"         : 1
;

actions new: camera_up
tick_actions+ "cl_up focal_point= [pin_position?];"
tick_actions+ "cl_up focal_point+ [vec2 = vec1 * -0.6 ?];"
tick_actions+ "cl_up position= [ball_position?];"
tick_actions+ "cl_up position+ [vec2 = vec1 * -0.5 + (0,0,10) ?];"
tick_actions+ "cl_up view_up= (0,0,1);"
tick_actions+ "aphigs cameras= cl_up;"
tick_actions+ "aphigs render!;";

view_left
        action= camera_left
        left!
        @ "xRefName"     : "view_panel"
        @ "yRefName"     : "view_up"
        @ "yAddHeight"   : 1
        @ "yOffset"      : 15
;

actions new: camera_left
tick_actions+ "cl_left focal_point= [pin_position?];"
tick_actions+ "cl_left focal_point+ [vec2 = vec1 * -0.6 ?];"
tick_actions+ "cl_left position= [ball_position?];"
tick_actions+ "cl_left position+ [vec2 = vec1 * -0.5 + (0,0,5) ?];"
tick_actions+ "cl_left view_up= (0,0,1);"
tick_actions+ "cl_left position+ [vec2 = [cl_left u_axis?] * 3 ?];"
tick_actions+ "aphigs cameras= cl_left;"
tick_actions+ "aphigs render!;";

view
        label="View"
        action=camera_reset
        @ "xRefName"     : "view_left"
        @ "yRefName"     : "view_up"
        @ "yAddHeight"   : 1
        @ "xAddWidth"    : 1
        @ "xAttachRight"         : 1
        @ "xResizable"   : 1
;

actions new: camera_reset
        tick_actions+ "aphigs cameras= cl;"
        tick_actions+ "aphigs render!;"
        tick_actions+ "view label= \"View\" action=camera_reset_top;"
;

actions new: camera_reset_top
        tick_actions+ "aphigs cameras= c5;"
        tick_actions+ "aphigs render!;"
        tick_actions+ "view label= \"Top View\" action=camera_reset;"
```

```
;
view_right
        action= camera_right
        right!
        @ "xRefName"       : "view"
        @ "yRefName"       : "view_up"
        @ "yAddHeight"     : 1
        @ "yOffset"        : 15
        @ "xAddWidth"      : 1
        @ "xAttachRight"          : 1
        @ "xVaryOffset"    : 1
;

actions new: camera_right
tick_actions+ "cl_right focal_point= [pin_position?];"
tick_actions+ "cl_right focal_point+ [vec2 = vec1 * -0.6 ?];"
tick_actions+ "cl_right position= [ball_position?];"
tick_actions+ "cl_right position+ [vec2 = vec1 * -0.5 + (0,0,5) ?];"
tick_actions+ "cl_right view_up= (0,0,1);"
tick_actions+ "cl_right position+ [vec2 = [cl_right u_axis?] * -3 ?];"
tick_actions+ "aphigs cameras= cl_right;"
tick_actions+ "aphigs render!;";

view_down
        action= camera_down
        down!
        @ "xRefName"       : "view_panel"
        @ "yRefName"       : "view_left"
        @ "yAddHeight"     : 1
        @ "xOffset"        : 45
        @ "yOffset"        : 15
        @ "yAttachBottom"         : 1
        @ "yVaryOffset"    : 1
;

actions new: camera_down
tick_actions+ "cl_down focal_point= [pin_position?];"
tick_actions+ "cl_down focal_point+ [vec2 = vec1 * -0.6?];"
tick_actions+ "cl_down position= [ball_position?];"
tick_actions+ "cl_down position+ [vec2 = vec1 * -0.4 + (0,0,1.5) ?];"
tick_actions+ "cl_down view_up= (0,0,1);"
tick_actions+ "aphigs cameras= cl_down;"
tick_actions+ "aphigs render!;";

light_panel
        @ "xRefName"       : "golf_panel"
        @ "yRefName"       : "view_panel"
        @ "yAddHeight"     : 1
        @ "xAddWidth"      : 0
;

toggle_light1
        label="OFF"
        state= 0
        on_action=light1_on
```

```
        off_action=light1_off
        @ "xRefName"     : "light_panel"
        @ "yRefName"     : "light_panel"
    ;
    actions new: light1_on
        tick_actions+"toggle_light1 label=\"ON\"; 12 on!; phigs render!;";
    actions new: light1_off
        tick_actions+"toggle_light1 label=\"OFF\"; 12 off!; phigs render!;";

toggle_light2
        label="OFF"
        state=0
        on_action=light2_on
        off_action=light2_off
        @ "xRefName"     : "toggle_light1"
        @ "yRefName"     : "light_panel"
        @ "xAddWidth"    : 1
        @ "xAttachRight"       : 1
        @ "xVaryOffset"  : 1
    ;
    actions new: light2_on
        tick_actions+"toggle_light2 label=\"ON\"; 13 on!;phigs render!;";
    actions new: light2_off
        tick_actions+"toggle_light2 label=\"OFF\"; 13 off!;phigs render!;";

title5
        title="Lights"
        @ "xRefName"     : "toggle_light1"
        @ "yRefName"     : "toggle_light1"
        @ "xOffset"      : 20
        @ "xAddWidth"    : 1
        @ "yAddHeight"   : 1
        @ "xAttachRight"       : 1
        @ "xResizable"   : 1
    ;

toggle_light3
        label="ON"
        state= 1
        on_action=light3_on
        off_action=light3_off
        @ "xRefName"     : "light_panel"
        @ "yRefName"     : "title5"
        @ "yAddHeight"   : 1
        @ "borderColor"  : goldenrod
        @ "background"   : gold
        @ "yAttachBottom"      : 1
        @ "yVaryOffset"  : 1
    ;
    actions new: light3_on
        tick_actions+"toggle_light3 label=\"ON\"; 11 on!;phigs render!;";
    actions new: light3_off
        tick_actions+"toggle_light3 label=\"OFF\"; 11 off!;phigs render!;";

toggle_light4
        label="OFF"
        state= 0
        on_action=light4_on
        off_action=light4_off
```

```
              @ "xRefName"    : "title5"
              @ "yRefName"    : "title5"
              @ "xAddWidth"   : 1
              @ "yAddHeight"  : 1
        ;
        actions new: light4_on
              tick_actions+"toggle_light4 label=\"ON\"; 14 on!;phigs render!;";
        actions new: light4_off
              tick_actions+"toggle_light4 label=\"OFF\"; 14 off!;phigs render!;";

golf_stop
              label="Stop"
              action=stop_ui
              @ "xRefName"    : "golf_panel"
              @ "yRefName"    : "light_panel"
              @ "yAddHeight"  : 1
        ;
        actions new: stop_ui
              tick_actions+"ui stop!;";

golf_help
              label="Help OFF"
              state= 0
              on_action=help_on_action
              off_action=help_off_action
              @ "xRefName"    : "golf_stop"
              @ "yRefName"    : "light_panel"
              @ "yAddHeight"  : 1
              @ "xAddWidth"   : 1
              @ "set"  : 0
        ;
        actions new: help_on_action
              tick_actions+"golf_help label=\"Help ON\"; help_on = 1;";
        actions new: help_off_action
              tick_actions+"golf_help label=\"Help OFF\"; help_on = 0; help_shell off!;";

golf_exit
              label="Exit"
              action=exit_oscar
              @ "xRefName"       : "golf_panel"
              @ "yRefName"       : "light_panel"
              @ "yAddHeight"     : 1
              @ "xAttachRight"   : 1
              @ "xVaryOffset"    : 1
        ;

actions new: exit_oscar
              tick_actions+"ui exit!;";
        renderers actors=(actor instances?) actors= (feet,my_feet instances );
        scalar new: xstart;
        scalar new: ystart;
        scalar new: xend;
        scalar new: xdelta;
        scalar new: ydelta;
        scalar new: yend;
        scalar new: width = 850;
        scalar new: height = 850;
        vector new: u dimension=3;
        vector new: v dimension=3;
        vector new: vpn dimension=3;
        vector new: xyz dimension=3;
        scalar new: coeff;
        logic new:  logic1;

actions new: button1;
```

```
actions new: azimuth
tick_actions+ "coeff = xdelta * 90 / width;"
tick_actions+ "cl azimuth: coeff;"
tick_actions+ "cl print:position;"
tick_actions+ "aphigs render!;";

actions new: elevation
tick_actions+ "coeff = ydelta * 90 / width;"
tick_actions+ "cl elevation: coeff;"
tick_actions+ "cl print:position;"
tick_actions+ "aphigs render!;";

actions new: button2
tick_actions+ "! button2: if (xdelta > ydelta) azimuth else elevation"
tick_actions+ "xstart print:value;"
tick_actions+ "xend   print:value;"
tick_actions+ "xdelta = xend - xstart print:value;"
tick_actions+ "ydelta = yend - ystart print:value;"
tick_actions+
"logicl greater:([xdelta abs?],[ydelta abs?]) true: \"azimuth tick!;\" false: \"elevation tick!;\";";

actions new: button3
tick_actions+ "! button3"
tick_actions+ "v = [cl v_axis?];"
tick_actions+ "u = [cl u_axis?];"
tick_actions+
        "vpn = [cl view_plane_normal?];"
tick_actions+ "coeff = [cl view_angle?];"
tick_actions+ "coeff / 2 tan! * 2 / width;"
tick_actions+ "coeff * [cl distance?];"
tick_actions+ "xdelta = xend - xstart print:value;"
tick_actions+ "ydelta = yend - ystart print:value;"
tick_actions+ "u * xdelta * coeff;"
tick_actions+ "v * ydelta * coeff;"
tick_actions+ "vpn * ydelta * coeff;"
tick_actions+ "xyz = (0,0,0) + u + v + vpn;"
tick_actions+ "cl position+ xyz;"
tick_actions+ "cl print:position;"
tick_actions+ "aphigs render!;";

actions new: button1_shift
tick_actions+ "! button1_shift";

actions new: yaw
tick_actions+ "coeff = xdelta * -90 / width;"
tick_actions+ "cl yaw: coeff;"
tick_actions+ "cl print:focal_point;"
tick_actions+ "aphigs render!;";

actions new: pitch
tick_actions+ "coeff = ydelta * 90 / width;"
tick_actions+ "cl pitch: coeff;"
tick_actions+ "cl print:focal_point;"
tick_actions+ "aphigs render!;";

actions new: button2_shift
tick_actions+ "! button2_shift: if xdelta > ydelta yaw else pitch"
tick_actions+ "xdelta = xend - xstart print:value;"
tick_actions+ "ydelta = yend - ystart print:value;"
tick_actions+
        "logicl greater:([xdelta abs?],[ydelta abs?]) true: \"yaw tick!;\" false: \"pitch tick!;\";";

actions new: button2_control
tick_actions+ "! button2_control"
tick_actions+ "xdelta = xend - xstart print:value;"
tick_actions+ "coeff = xdelta * 90 / width;"
tick_actions+ "cl roll: coeff;"
tick_actions+ "cl print:view_up;"
tick_actions+ "aphigs render!;";
```

```
actions new: button3_control;
-button3_control tick_actions+ "! button3_control";

actions new: no_mouse_action
    tick_actions="
        ui
            event= \"\"
        ;
    "
tick_actions+ "! exit workspace"
;

actions new: mouse_action
    tick_actions="
        ui
            event= \"mouse\"
        ;
    "
tick_actions+ "! enter workspace"
;

vector new: my_events dimension=3
        components= (ButtonPress, ButtonRelease /* ,MotionNotify */);

ui_mouse new: mouse
        parent= phigs_workspace
        button2= pin_button
        button3= ball_button
        x_start= "xstart"
        y_start= "ystart"
        x_end= "xend"
        y_end= "yend"
        input_mask= ButtonPressMask
        input_mask+ ButtonReleaseMask
        input_mask+ OwnerGrabButtonMask events= "my_events"
;

actions new: ball_button
tick_actions+ "! button3"
tick_actions+ "coeff = [c5 view_angle?];"
tick_actions+ "coeff / 2 tan! / width / .5 * [c5 distance?];"
tick_actions+ "xdelta = xend - [s1 = width / 2 ?];"
tick_actions+ "ydelta = yend - s1;"
tick_actions+ "xdelta * coeff;"
tick_actions+ "ydelta * coeff * -1;"
tick_actions+ "u = (40,60,0) + (xdelta, ydelta, 0);"
tick_actions+ "ball_position = ([u @ 1 ?], [u @2 ?], [agreen @ ([u @1 ?], [u@2 ?]) z?]);"
tick_actions+ "common_actions tick!;";

actions new: pin_button
tick_actions+ "! button2"
tick_actions+ "coeff = [c5 view_angle?];"
tick_actions+ "coeff / 2 tan! / width / .5 * [c5 distance?];"
tick_actions+ "xdelta = xend - [s1 = width / 2 ?];"
tick_actions+ "ydelta = yend - s1;"
tick_actions+ "xdelta * coeff;"
tick_actions+ "ydelta * coeff * -1;"
tick_actions+ "u = (40,60,0) + (xdelta, ydelta, 0);"
tick_actions+ "pin_position = ([u @ 1 ?], [u @2 ?], [agreen @ ([u @1 ?], [u@2 ?]) z?]);"
tick_actions+ "common_actions tick!;";

common_actions
tick_actions+ "phigs render!;";

/* define help instances */ scalar new: help_on = 0;
```

```
actions new: help
tick_actions+ "log = help_on true: \"universal_help tick!;\";";
actions new: universal_help
tick_actions+ "help_ok @ set : 0;"
tick_actions+ "current_widget + \"_help\";"
tick_actions+ "help_text line= [object # current_widget ?]; help_shell on!;";

ui_popup new: help_shell parent= ui create!;
ui_control_panel new: help_panel parent= help_shell create!;
ui_text new: help_text parent= help_panel create!;
ui_button new: help_ok parent= help_panel create!;

help_panel
        @ "xResizable"      : 1
        @ "yResizable"      : 1
        @ "borderColor"  : white
        @ "background"   : white
;

help_ok
        label= "OK"
        action= ok
        @ "xRefName"     : "help_panel"
        @ "yRefName"     : "help_panel"
        @ "borderColor"  : goldenrod
        @ "background"   : gold
        @ "xOffset"      : 8
        @ "yOffset"      : 8
actions new: ok
tick_actions+ "help_shell off!;";

help_text
        @ "xRefName"     : "help_panel"
        @ "yRefName"     : "help_ok"
        @ "yAddHeight"   : 1
        @ "width"        : 300
        @ "height"       : 100
        @ "gravity"      : "NorthWestGravity"
        @ "xResizable"   : 0
        @ "wrap"         : 1
        @ "borderColor"  : white
        @ "background"   : white
        @ "xOffset"      : 8
        @ "yOffset"      : 8
        @ "font"         : [font font_name= "8x13bold" font?]
;

/* Here you place your own help texts */ string new: golf_stop_help = "Interrupts X Event Loop; to start it again type: 'ui cont!;'
";

string new: continue_help = "Position the ball at the end of trajectory and readjust camer
a position; recalculate suggested speed, direction and distance to hole";

string new: solve_help = "Calculate the appropriate speed and angle for ball to hit the ho
le and display the trajectory";

string new: golf_putt_help = "Perform a putt with specified speed and direction";

string new: golf_exit_help = "Exit the program";

string new: golf_help_help = "To get help, position cursor over an item in question; help
is disabled by toggling Help";

string new: x_ball_value_help = "The current ball X coordinate;";

string new: y_ball_value_help = "The current ball Y coordinate;";
```

```
string new: x_ball_slider_help = "Define the X coordinate of ball position; camera positio
ned slightly behind the ball focusing on pin";

string new: y_ball_slider_help = "Define the Y coordinate of ball position; camera positio
ned slightly behind the ball focusing on pin";

string new: x_pin_value_help = "The current pin X coordinate;";

string new: y_pin_value_help = "The current pin Y coordinate;";

string new: x_pin_slider_help = "Define the X coordinate of pin position; camera positione
d slightly behind the ball focusing on pin";

string new: y_pin_slider_help = "Define the Y coordinate of pin position; camera positione
d slightly behind the ball focusing on pin";

string new: speed_value_help = "Suggested ball's initial speed (based on flat green, in fe
et per seconds)";

string new: direction_value_help = "Suggested ball's initial direction (zero angle corresp
onds to the direction to the pin, positive - to the left, negative - to the right)";

string new: distance_to_hole_value_help = "Distance from ball to pin in feet";

string new: speed_arrow_left_help = "Decrease the initial ball speed by 1%";

string new: speed_arrow_right_help = "Increase the initial ball speed by 1%";

string new: direction_arrow_left_help = "Increase the initial ball direction by 0.5 degr
 to the left";

string new: direction_arrow_right_help = "Increase the initial ball direction by 0.5 deg
e to the right";

string new: perfect_putt_speed_value_help = "Initial speed of perfect putt in feet per s
onds";

string new: perfect_putt_angle_value_help = "Initial angle of perfect putt in degrees";

string new: view_up_help = "Position the camera at 10 feet above the green";

string new: view_left_help = "Position the camera at 3 feet to the left behind the ball";

string new: view_right_help = "Position the camera at 3 feet to the right behind the ball
";

string new: view_down_help = "Position the camera at 1.5 foot above the green";

string new: view_help = "Reset camera position (about 6 feet above the green)";

string new: toggle_light1_help = "North West light switch";

string new: toggle_light2_help = "North East light switch";

string new: toggle_light3_help = "South West light switch";

string new: toggle_light4_help = "South East light switch";

string new: title5_help = "Illumination control panel, use toggles to switch lights on an
 off";

string new: help_ok_help = "Close the help window";

string new: render_help = "Render everything";

string new: reset_pin_and_ball_help = "Sets Pin at (47,72) and ball at (50,40)";

string new: toggle_manipulator_help =
"Changes mouse functionality. Pin & Ball means that middle button drag will relatively mo
e the pin and the flag and right button drag will relatively move the ball. When Camera i
selected, mouse buttons control camera motion.";
```

```
/* define colors for backgrounds and foregrounds */ ui_instances @ background : Gold;
ui_instances @ "borderColor" : Gold;
ui_instances @ foreground : white;

titles @ background : Gold;
titles @ foreground : black;
titles @ "borderColor" : Gold;

buttons @ "background" : seagreen;
arrows @ "foreground" : black;

golf       Thu Jun 14 13:44:09 1990 toggles @ "foreground" : Black;
golf_workspace_panel @ "background" : white;

collection new: modellers
        members=[byu instances?]
        ambient=(.1,.1,.1);

actions new: difficulty
tick_actions+ "green_model scalar_file= mohawk4.s fringes=1
    scalar_range=(.02,2,9);"
tick_actions+ "pin_position= (55,89,[agreen @ (55,89) z?]);"
tick_actions+ "common_actions tick!;"
;

ui on!;

aphigs window_id=[phigs_workspace window_id?];

reset_pin_and_ball_action tick!;
mouse_action tick!;

ui start!;
```

What is claimed is:

1. A user interface for facilitating interaction between a system user simulating a natural player and a golf green/golf putt modeling system, said interface comprising a screen for display of a simulated golf green and a window display representing a control panel, said green including a display of a golf ball, a putter head and a cup, pointing means for positioning a virtual camera for viewing the green from different points on the green to present a display of the green from the point of viewing, said control panel including means for performing interactions between the putter head and a golf ball in response to control selections by the system user, including a plurality of control elements responsive to said control selections by the system user to effect said interaction, said control elements including a first x and y coordinate slider for selecting and changing the position of the golf ball on the green, a second x and y coordinate slider for selecting and changing the position of the cup on the green and means for placing the virtual camera in a position simulating a position of a natural player so that the ball and the cup are maintained in the field of view whenever a selected position of the ball or cup is changed.

2. A user interface n accordance with claim 1 further comprising means for automatically restoring the field of view of the golf green whenever a selected position of the ball or cup is changed.

3. A user interface in accordance with claim 2 wherein viewing positions are predefined and include, relative to the ball position, one step to the left, one step to the right and directly above the ball.

4. A user interface in accordance with claim 1 further comprising means for selecting illumination of the green.

5. A user interface in accordance with claim 4 wherein said illumination selecting means comprises toggles.

6. A user interface in accordance with claim 1 wherein said interface is to be displayed on a Stellar graphics computer.

7. A user interface in accordance with claim 1, wherein said control panel further comprises means for selecting an initial putt speed and direction of the golf ball.

8. A user interface in accordance with claim 7 further comprising means for initiating a display of a putt trajectory based on the selected initial putt speed and direction.

9. A user interface in accordance with claim 8 further comprising means for displaying the ball on the green at the end of the putt trajectory and adjusting the virtual camera to a new position so that the ball and cup are maintained in the field of view.

10. A user interface in accordance with claim 1 further comprising means for determination of a perfect putt.

11. A user interface in accordance with claim 1 further comprising means for stopping operations and enabling direct message communication with the system via a standard input.

12. A user interface in accordance with claim 1 further comprising means to select help mode operation for displaying interface descriptions in a separate window.

13. A user interface in accordance with claim 1 further comprising means to select termination of the session.

14. A user interface as set forth in claim 1, wherein said control panel further includes means for displaying putting speed and putting direction of the golf ball and distance from the golf ball to the cup and said control elements include user actuated means for changing the putting speed and direction of the golf ball and means for executing a putt.

15. A user interface as set forth in claim 1, where each said first and said second x and y sliders are independent so as to permit separate selections of the corresponding x and y coordinates of the golf ball and the cup.

16. A user interface as set forth in claim 15, where each slider is adapted for horizontal movement across the control panel and further including display means on said control panel for displaying the corresponding x and y coordinates of the sliders in response to positioning of the sliders.

17. A user interface as set forth in claim 1, further including means for displaying a selected direction for the golf ball and said control elements further include user actuated means for changing the direction of the golf ball and means for executing a putt.

18. A user interface as set forth in claim 1, further including means for displaying a selected putting distance and said control elements further include user actuating means for changing the putting speed and means for executing a putt.

* * * * *